(12) United States Patent
Chen et al.

(10) Patent No.: US 10,261,853 B1
(45) Date of Patent: Apr. 16, 2019

(54) DYNAMIC REPLICATION ERROR RETRY AND RECOVERY

(71) Applicant: EMC Corporation, Hopkinton, MA (US)

(72) Inventors: Xiangping Chen, Sherborn, MA (US); David Meiri, Cambridge, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 151 days.

(21) Appl. No.: 15/195,121

(22) Filed: Jun. 28, 2016

(51) Int. Cl.
*G06F 11/07* (2006.01)
*G06F 11/14* (2006.01)

(52) U.S. Cl.
CPC ........ *G06F 11/079* (2013.01); *G06F 11/0727* (2013.01); *G06F 11/1415* (2013.01); *G06F 2201/805* (2013.01)

(58) Field of Classification Search
CPC . G06F 11/079; G06F 11/0272; G06F 11/1458
See application file for complete search history.

(56) References Cited

U.S. PATENT DOCUMENTS

| 6,785,786 | B1* | 8/2004 | Gold | G06F 11/1461 |
| | | | | 711/162 |
| 9,582,372 | B1* | 2/2017 | Chai | G06F 11/1458 |
| 9,811,542 | B1* | 11/2017 | Payne | G06F 17/30289 |
| 2007/0136389 | A1* | 6/2007 | Bergant | G06F 11/1435 |
| 2010/0293412 | A1* | 11/2010 | Sakaguchi | G06F 11/0727 |
| | | | | 714/17 |
| 2015/0370825 | A1* | 12/2015 | Outcalt | G06F 17/30174 |
| | | | | 707/608 |

* cited by examiner

*Primary Examiner* — Yolanda L Wilson
(74) *Attorney, Agent, or Firm* — Krishnendu Gupta; Lesley Leonessa

(57) ABSTRACT

A system, computer program product, and computer-executable method of managing replication within a data storage system, the system, computer program product, and computer-executable method including receiving an error related to a replication session within the data storage system, analyzing the error, based on the analysis, determining whether to retry the replication session, upon a positive determination, calculating a first time interval for the replication session, and retrying the replication session upon completion of the first time interval.

18 Claims, 7 Drawing Sheets

DYNAMIC REPLICATION ERROR RETRY AND RECOVERY

A portion of the disclosure of this patent document may contain command formats and other computer language listings, all of which are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This invention relates to data storage.

BACKGROUND

Computer systems are constantly improving in terms of speed, reliability, and processing capability. As is known in the art, computer systems which process and store large amounts of data typically include a one or more processors in communication with a shared data storage system in which the data is stored. The data storage system may include one or more storage devices, usually of a fairly robust nature and useful for storage spanning various temporal requirements, e.g., disk drives. The one or more processors perform their respective operations using the storage system. Mass storage systems (MSS) typically include an array of a plurality of disks with on-board intelligent and communications electronics and software for making the data on the disks available.

Companies that sell data storage systems are very concerned with providing customers with an efficient data storage solution that minimizes cost while meeting customer data storage needs. It would be beneficial for such companies to have a way for reducing the complexity of implementing data storage.

SUMMARY

A system, computer program product, and computer-executable method of managing replication within a data storage system, the system, computer program product, and computer-executable method including receiving an error related to a replication session within the data storage system, analyzing the error, based on the analysis, determining whether to retry the replication session, upon a positive determination, calculating a first time interval for the replication session, and retrying the replication session upon completion of the first time interval.

BRIEF DESCRIPTION OF THE DRAWINGS

Objects, features, and advantages of embodiments disclosed herein may be better understood by referring to the following description in conjunction with the accompanying drawings. The drawings are not meant to limit the scope of the claims included herewith. For clarity, not every element may be labeled in every figure. The drawings are not necessarily to scale, emphasis instead being placed upon illustrating embodiments, principles, and concepts. Thus, features and advantages of the present disclosure will become more apparent from the following detailed description of exemplary embodiments thereof taken in conjunction with the accompanying drawings in which:

Like reference symbols in the various drawings indicate like elements.

DETAILED DESCRIPTION

Figure 1:
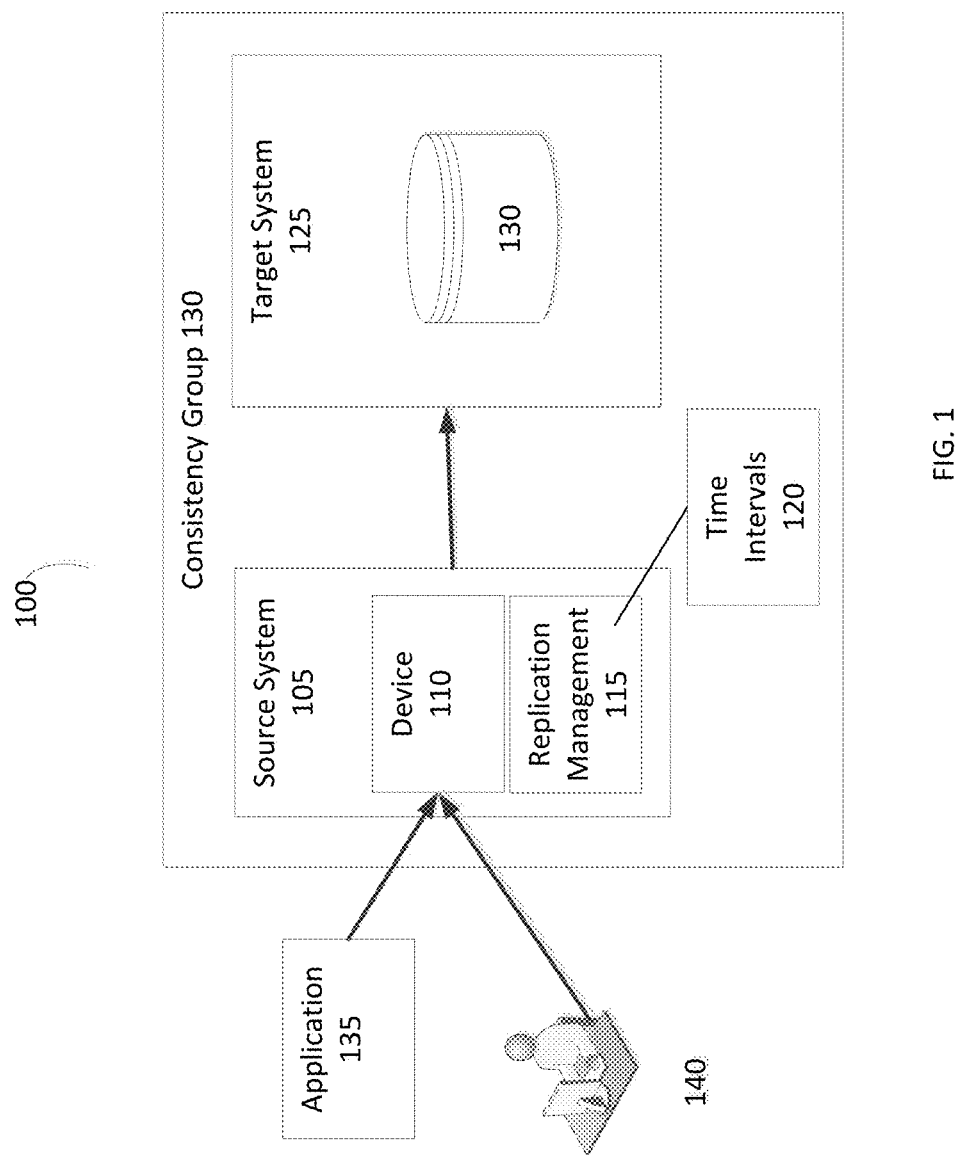
FIG. 1 is a simplified illustration of a data storage system managing replication of data from a source system to a target system, in accordance with an embodiment of the present disclosure.

Traditionally, data storage systems use replication to maintain data between a source site and a target site. Typically, data replication runs as a background service. Generally, once a replication session is configured, the replication session transfers data updates from source to target continuously without manual intervention. Traditionally, at times, a replication session encounters errors that prevent the replication session from continuing without intervention. Conventionally, improvements to replication techniques would be beneficial to the data storage industry.

Typically, existing approaches set a predefined fixed retry interval in the case of an error retry. Traditionally, an error retry presents a challenge of determining the optimal value of retry interval. Generally, a retry interval that causes retry of a replication session to be too frequent increases the load of an already strained data storage system. Conventionally, frequent retries of replication sessions stretch the limit of a strained data storage system when many replication sessions are configured. Generally, these problems are especially exasperated when each of the replication sessions encounter the same resource shortage. For example, in an embodiment, each replication session may be waiting for communication links to become active, for system resources to free up, or for the number of snapshots to go below a pre-determined threshold. Further, typically, too infrequent retries may lead to a less responsive recovery and unwarranted replication Recover Point Objective (RPO) violations.

In many embodiments, the current disclosure may enable a data storage system to handle replication errors without admin intervention. In various embodiments, the current disclosure may enable a data storage system to adjust execution of replication sessions based on errors encountered. In certain embodiments, the current disclosure may enable a data storage system to postpone or terminate a replication session based on a type of error encountered during one or more replication sessions. In some embodiments, the current disclosure may enable a data storage system to initiate and/or re-initiate replication sessions once the data storage system detects major changes to the data storage system.

Hash-Based Replication

In a Content Addressable Storage (CAS) array, data is stored in blocks, for example of 4 KB, where each block has a unique large hash signature, for example of 20 bytes, saved on Flash memory. As described herein, hash signatures are accessed by small in-memory handles (Called herein short hash handles), for example of 5 bytes. These handles are unique to each array, but not necessarily unique across arrays. When replicating between two CAS arrays, it is much more efficient to use hash signatures instead of sending the full block. If the target already has the data block corresponding to the hash signature, there is no need to send the corresponding data. However, reading the hash signatures may be expensive, and is wasteful if the target does not have the data (in this case it is faster to send the data without a hash signature, and let the target calculate the hash signature.) While the short hash handles are readily available without the need to read from Flash, since the short hash handles are not unique, they cannot be easily used to check if a target contains a hash signature. In some implementations, short hash handles are shortcuts for hash signatures, and can give a reliable hint of the existence of a hash signature in an array. Described herein is an approach to use these short hash handles, verify them through the hash signature, and send the data as needed. While the description describes using this approach with de-duplication storage devices, it would be appreciated by one of ordinary skill in the art that the approach described herein may be used with any type of storage device including those that do not use de-duplication.

The examples described herein include a networked memory system. The networked memory system includes multiple memory storage units arranged for content addressable storage of data. The data is transferred to and from the storage units using separate data and control planes. Hashing is used for the content addressing, and the hashing produces evenly distributed results over the allowed input range. The hashing defines the physical addresses so that data storage makes even use of the system resources.

A relatively small granularity may be used, for example with a page size of 4 KB, although smaller or larger block sizes may be selected at the discretion of the skilled person. This enables the device to detach the incoming user access pattern from the internal access pattern. That is to say the incoming user access pattern may be larger than the 4 KB or other system-determined page size and may thus be converted to a plurality of write operations within the system, each one separately hashed and separately stored.

Content addressable data storage can be used to ensure that data appearing twice is stored at the same location. Hence unnecessary duplicate write operations can be identified and avoided. Such a feature may be included in the present system as data deduplication. As well as making the system more efficient overall, it also increases the lifetime of those storage units that are limited by the number of write/erase operations.

The separation of Control and Data may enable a substantially unlimited level of scalability, since control operations can be split over any number of processing elements, and data operations can be split over any number of data storage elements. This allows scalability in both capacity and performance, and may thus permit an operation to be effectively balanced between the different modules and nodes.

The separation may also help to speed the operation of the system. That is to say it may speed up Writes and Reads. Such may be due to:

(a) Parallel operation of certain Control and Data actions over multiple Nodes/Modules (b) Use of optimal internal communication/networking technologies per the type of operation (Control or Data), designed to minimize the latency (delay) and maximize the throughput of each type of operation.

Also, separation of control and data paths may allow each Control or Data information unit to travel within the system between Nodes or Modules in the optimal way, meaning only to where it is needed and if/when it is needed. The set of optimal where and when coordinates is not the same for control and data units, and hence the separation of paths ensures the optimization of such data and control movements, in a way which is not otherwise possible. The separation is important in keeping the workloads and internal communications at the minimum necessary, and may translate into increased optimization of performance.

De-duplication of data, meaning ensuring that the same data is not stored twice in different places, is an inherent effect of using Content-Based mapping of data to D-Modules and within D-Modules.

Scalability is inherent to the architecture. Nothing in the architecture limits the number of the different R, C, D, and H modules which are described further herein. Hence any number of such modules can be assembled. The more modules added, the higher the performance of the system becomes and the larger the capacity it can handle. Hence scalability of performance and capacity is achieved.

Further information about Hash-Based Replication may be found in U.S. Pat. No. 9,378,106 issued on Jun. 28, 2016, assigned to EMC Corporation of Hopkinton, Mass. and is hereby incorporated by reference in its entirety.

Dynamic Replication Error Retry and Recovery

In many embodiments, the current disclosure may enable a data storage system to recover from replication errors and/or data storage system errors. In various embodiments, the current disclosure may enable a data storage system to recover and/or retry after encountering errors without manual intervention. In certain embodiments, the current disclosure may enable a data storage system to distinguish between permanent and temporary errors and may enable the data storage system to take appropriate action to ensure that a replication session completes. In other embodiments, the current disclosure may enable a data storage system encountering errors to retry failed operations and/or recover automatically once and the state of the data storage system improves. In most embodiments, temporary errors may include, but are not limited to, a faulty network connection between a source and target, shortages of storage space and/or shortages of other system resources.

In most embodiments, the current disclosure may enable a data storage system to implement a dynamic retry approach to replication. In various embodiments, dynamic retry of replication may enable a data storage system to ensure a minimum amount of retrying replication sessions in the case of no change or improvement in system errors. In other embodiments, dynamic retry of replication may enable a data storage system to recover instantaneously as soon as any issue with a data storage system improves.

In many embodiments, a data storage system may include a replication management module which may be enabled to manage replication sessions from a source system to a target system. In various embodiments, when a replication session operation encounters errors, a replication management module may be enabled to determine whether the encountered error may be temporary or permanent. In certain embodiments, upon determining that an error is temporary, the replication management module may be enabled to schedule and/or calculate a time interval in which to retry a given replication session. In some embodiments, upon calculating an initial retry interval for temporary error situations, the replication management module may set a state of a replication session to "wait for resources" and wait the time interval to retry the replication session.

In most embodiments, for each failure of a retry of a replication session, a replication management module may evaluate the urgency and/or priority of the replication session based on an associated Recover Point Objective (RPO) deadline, Service Level Objective (SLO) agreement, and/or the likelihood of success of retrying a replication session. In various embodiments, a replication management module may more aggressively schedule a time interval to retry a replication session if there may be a higher chance of missing a deadline/objective. In certain embodiments, when determining the likelihood of successful retry of a replication session, a replication management module may analyze various aspects of a system problem. For example, in an embodiment, a replication management module may analyze, for link errors, whether the link may have been recovered. In another embodiment, for resource issues, a replication management module may analyze whether the resources have become more available. In a yet further embodiment, for degraded systems, a replication management module may analyze whether the system may have recovered. In most embodiments, upon analyzing the many of the abovementioned issues, a replication management module may recalculate a retry time interval for a replication session based on urgency priority and wait for the next retry time.

In many embodiments, a replication management module may monitor a data storage system for major system events and/or replication control changes. For example, in various embodiments, a user may decide to terminate a replication session and, in response, a replication management module may be woken up to handle the new situation, which may include retrying a previously failed replication session immediately. In some embodiments, a replication management module may immediately restart each replication session currently waiting for a time interval to complete upon notification of a major system event and/or replication control change. In most embodiments, a major system event may include replacement of one or more parts of a data storage system, initialization or re-initialization of one or more systems in communication with the data storage systems, and/or other events that may be defined by a user and/or admin. In various embodiments, a replication control change may include, but is not limited to, a user and/or admin stopping and/or modifying one or multiple replication sessions. In certain embodiments, a user and/or admin may be enabled to designate which events and/or type of events may be a major system event and/or replication control change. In other embodiments, a user and/or admin may be enabled to augment variables of the time interval calculation including, but not limited to, initial value, functional increase, and/or other values that may affect the frequency of a replication session.

Refer to the example embodiment of FIG. 1. FIG. 1 is a simplified illustration of a data storage system managing replication of data from a source system to a target system, in accordance with an embodiment of the present disclosure. System 100 includes source system 105 and target system 125. Source system 105 and target system 125 are in consistency group 130. Source system 105 provides device 110 for use by application 135 and user 140. Source system 105 includes replication management module 115 which is enabled to manage replication sessions between source system 105 and target system 125, where device 110 is replicated to device 130. Replication management 115 includes time interval module 120, which maintains information of when the replication management module 115 should retry failed replication sessions to target system 125.

Figure 2A:
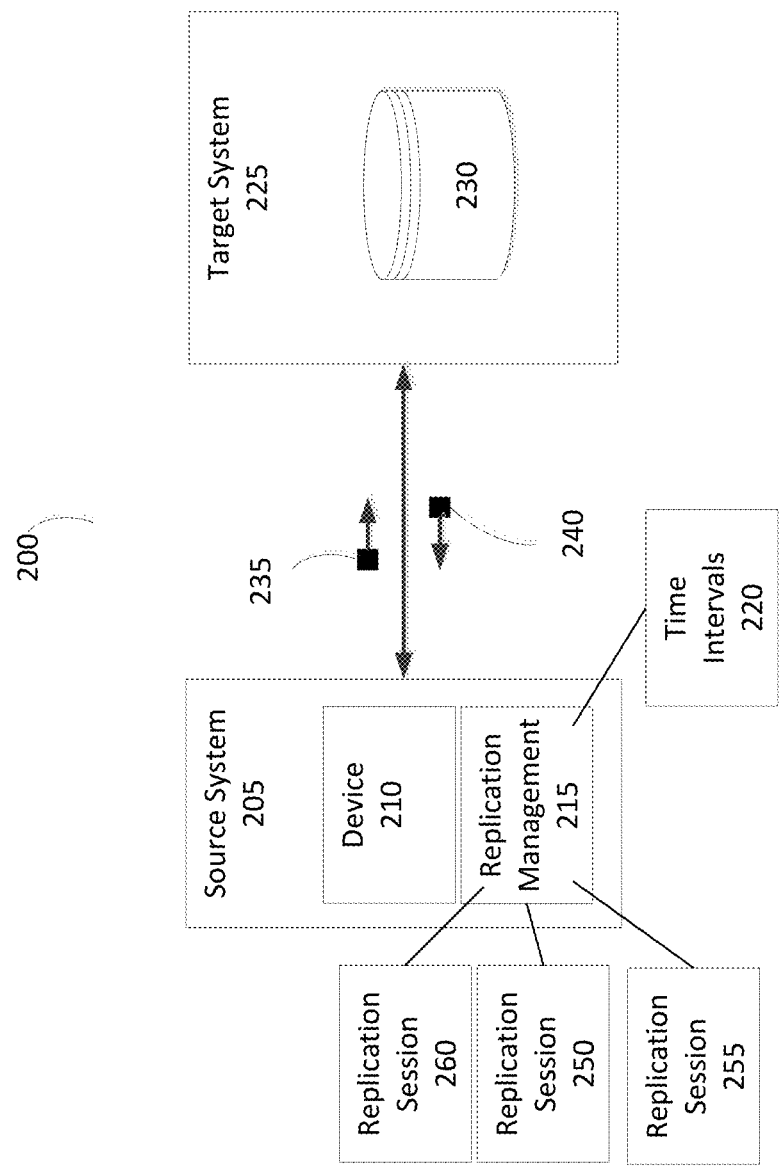
FIG. 2A is a simplified illustration of a first state of a system replicating data from a source system to a target system, in accordance with an embodiment of the present disclosure.
Figure 2B:
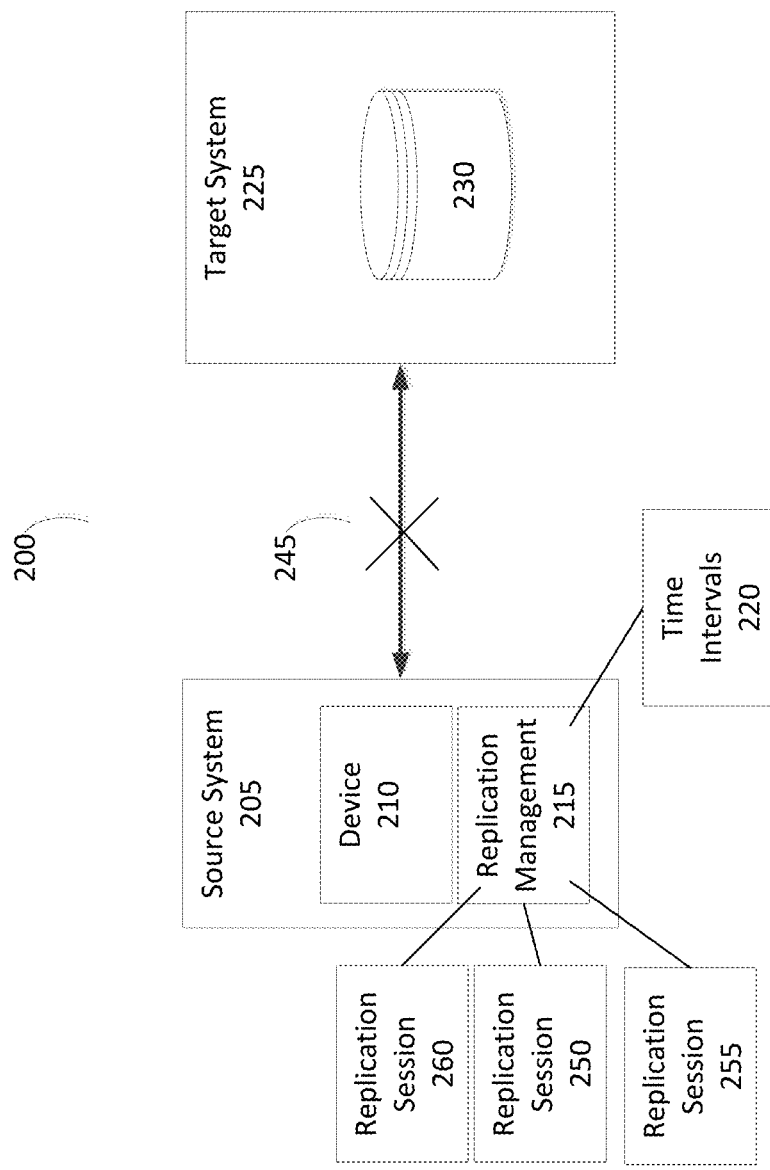
FIG. 2B is a simplified illustration of a second state of a system replicating data from a source system to a target system, in accordance with an embodiment of the present disclosure.

Refer to the example embodiments of FIGS. 2A and 2B. FIG. 2A is a simplified illustration of a first state of a system replicating data from a source system to a target system, in accordance with an embodiment of the present disclosure. System 200 includes source system 205 and target system 225. Source system 205 includes device 210 and replication management module 215. Target system 225 includes device 230. Source system 205 is in communication with target system 225. Replication management module 215 is managing replication sessions 250, 255, 260 associated with replication of data from device 210 to device 230. Replication management module 215 includes time intervals module 220 which manages time intervals for replication sessions that waiting to be retried. Source system 205 and target system 225 are enabled to use message 235 and message 240 to facilitate replication of data on device 210 to device 230.

FIG. 2B is a simplified illustration of a second state of a system replicating data from a source system to a target system, in accordance with an embodiment of the present disclosure. As shown in FIG. 2B, system 200 includes source system 205 and target system 225. However, in this embodiment, the link between source system 205 and target system 225 is down as shown by symbol 245.

Figure 3:
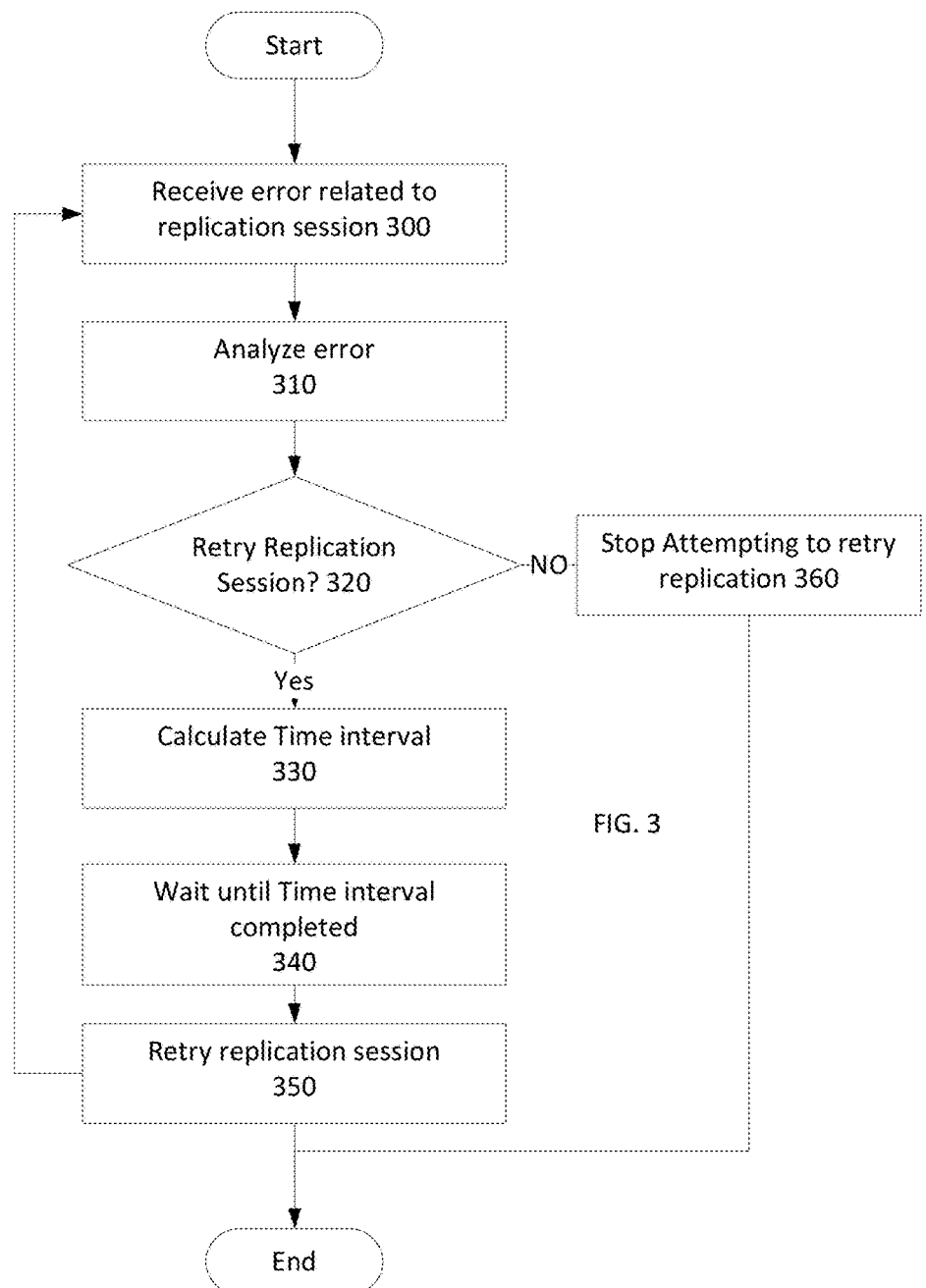
FIG. 3 is as simplified flowchart of a method of managing replication sessions in the system described in FIG. 2A, in accordance with an embodiment of the present disclosure.

Refer to the example embodiments of FIGS. 2A and 3. FIG. 3 is as simplified flowchart of a method of managing replication sessions in the system described in FIG. 2A, in accordance with an embodiment of the present disclosure. System 200 includes source system 205 and target system 225. Source system 205 includes device 210 and replication management module 215. Target system 225 includes device 230. Replication management module 215 is managing replication sessions 250, 255, 260 on source system 205. In this embodiment, replication management module 215 receives an error related to replication session 250 from source system 205 (Step 300). Replication management module 215 analyzes the received error (Step 310) and determines whether to retry replication session 250 (Step 320). In many embodiments, a determination of whether to retry a replication session may be based on whether the error is a temporary error or a permanent error. In various embodiments, if a replication management module receives notice of a temporary error, the replication management module may reschedule and/or postpone a replication session by a calculated time interval.

In this embodiment, if the replication management module 215 determines that the received error is a permanent error in system 200, replication management module 215 stops attempting to retry the replication session (Step 360). If the replication management module 215 determines that the received error is a temporary error in system 200, replication management module 215 continues with the retry processing. Replication management module 215 uses time intervals module 220 to calculate a time interval for replication session 250 taking into account Recover Point Objectives (RPOs) and/or Service Level Objectives (SLOs) associated with replication session 250. Replication management module 215 pauses replication session 250 and sets a status for replication session 250. Replication management module 215 waits until the time interval has completed (Step 340) and retries replication session 250 (Step 350). If the replication management module 215 receives another error, the replication management module 215 repeats the abovementioned steps (steps 300-360).

Figure 4:
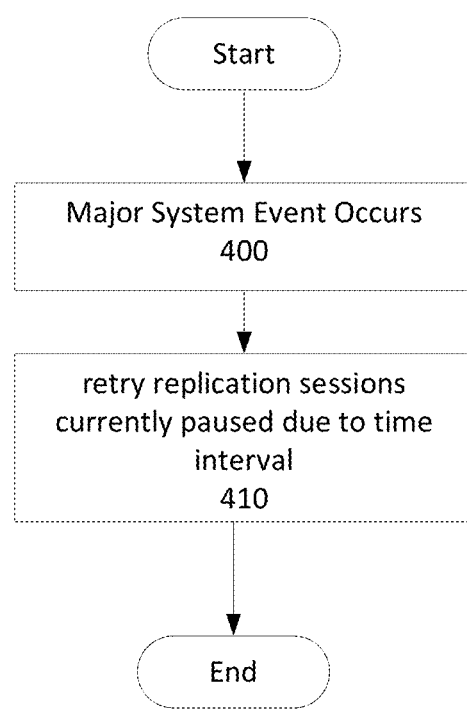
FIG. 4 is a simplified flowchart of a method of managing replication sessions in the system described in FIG. 2B, in accordance with an embodiment of the present disclosure

Refer to the example embodiments of FIGS. 2B and 4. FIG. 4 is a simplified flowchart of a method of managing replication sessions in the system described in FIG. 2B, in accordance with an embodiment of the present disclosure. System 200 includes source system 205 and target system 225. Source system 205 includes device 210 and replication management module 215. Target system 225 includes device 230. Replication management module 215 is managing replication sessions 250, 255, 260 on source system 205. In this embodiment, a link failure occurs (245). Source system 205 notifies replication management 215 that a link failure has occurred. Replication management 215 analyzes the received error message and makes a determination that the link failure is a temporary error. Replication management module 215 uses time intervals module 220 to calculate a time interval for each of the replication sessions 250, 255, 260 and pauses the replication sessions 250, 255, 260. Upon the link failure (245) resetting and coming back online, source system 205 detects that as a major system event occurring (Step 400). Replication Management module 215 immediately removes the pause on any replication session currently waiting on a time interval and retries replication sessions 250, 255, 260 (Step 410).

General

The methods and apparatus of this invention may take the form, at least partially, of program code (i.e., instructions) embodied in tangible non-transitory media, such as floppy diskettes, CD-ROMs, hard drives, random access or read only-memory, or any other machine-readable storage medium.

Figure 5:
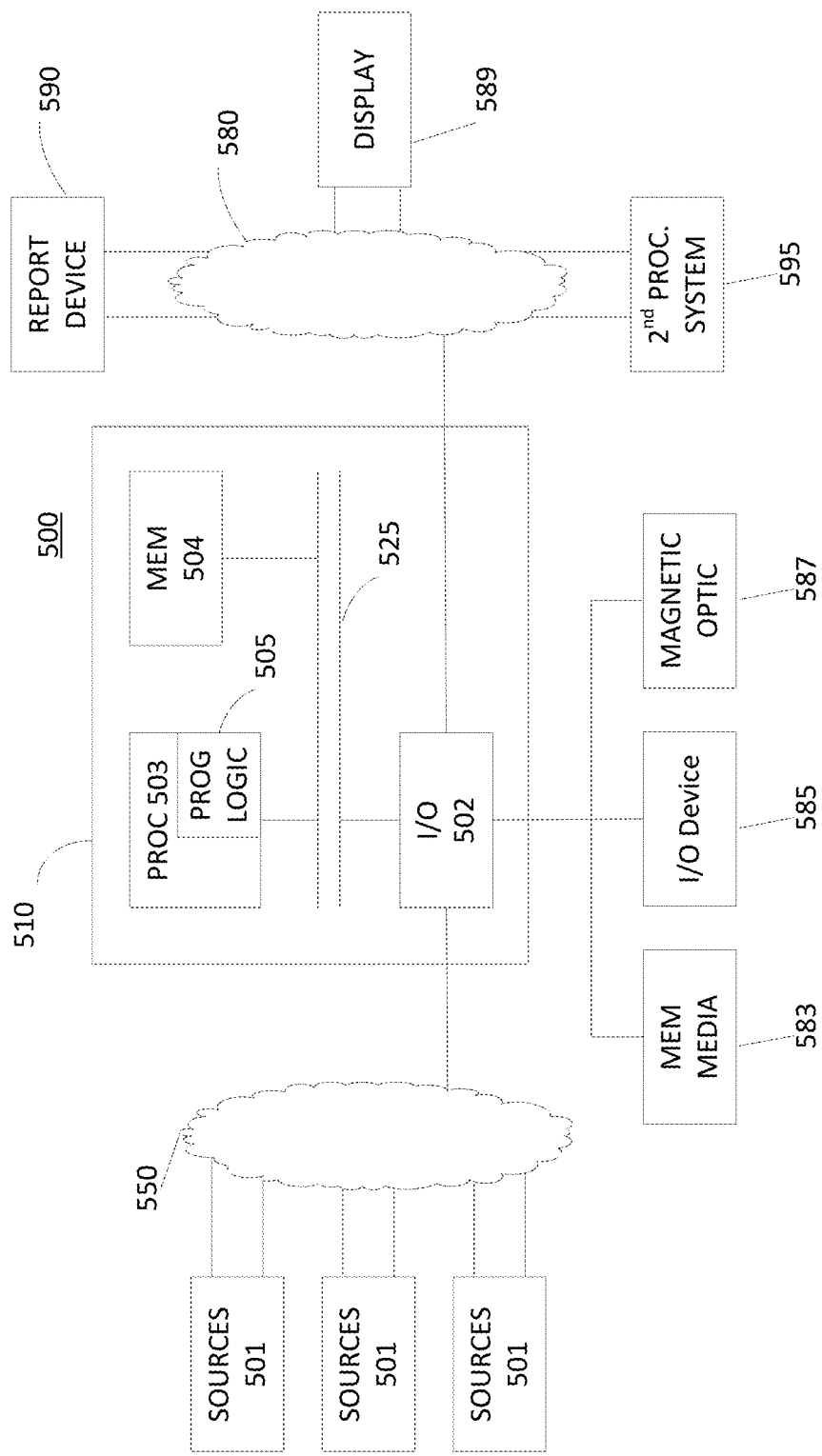
FIG. 5 is an example of an embodiment of an apparatus that may utilize the techniques described herein, in accordance with an embodiment of the present disclosure.

FIG. 5 is a block diagram illustrating an apparatus, such as a computer 510 in a network 500, which may utilize the techniques described herein according to an example embodiment of the present invention. The computer 510 may include one or more I/O ports 502, a processor 503, and memory 504, all of which may be connected by an interconnect 525, such as a bus. Processor 503 may include program logic 505. The I/O port 502 may provide connectivity to memory media 583, I/O devices 585, and drives 587, such as magnetic drives, optical drives, or Solid State Drives (SSD). When the program code is loaded into memory 504 and executed by the computer 510, the machine becomes an apparatus for practicing the invention. When implemented on one or more general-purpose processors 503, the program code combines with such a processor to provide a unique apparatus that operates analogously to specific logic circuits. As such, a general purpose digital machine can be transformed into a special purpose digital machine.

Figure 6:
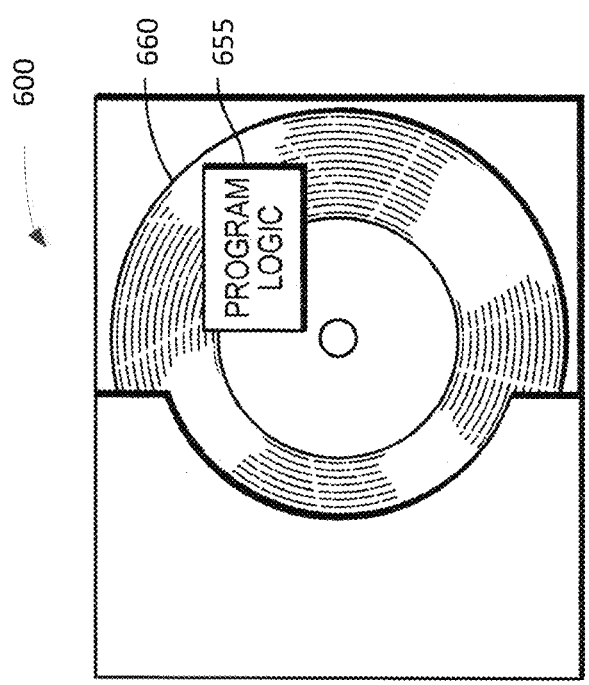
FIG. 6 is an example of a method embodied on a computer readable storage medium that may utilize the techniques described herein, in accordance with an embodiment of the present disclosure.

FIG. 6 is a block diagram illustrating a method embodied on a computer readable storage medium 660 that may utilize the techniques described herein according to an example embodiment of the present invention. FIG. 6 shows Program Logic 655 embodied on a computer-readable medium 660 as shown, and wherein the Logic is encoded in computer-executable code configured for carrying out the methods of this invention and thereby forming a Computer Program Product 600. Program Logic 655 may be the same logic 505 on memory 504 loaded on processor 503 in FIG. 5. The program logic may be embodied in software modules, as modules, as hardware modules, or on virtual machines.

The logic for carrying out the method may be embodied as part of the aforementioned system, which is useful for carrying out a method described with reference to embodiments shown in, for example, FIGS. 1-6. For purposes of illustrating the present invention, the invention is described as embodied in a specific configuration and using special logical arrangements, but one skilled in the art will appreciate that the device is not limited to the specific configuration but rather only by the claims included with this specification.

Although the foregoing invention has been described in some detail for purposes of clarity of understanding, it will be apparent that certain changes and modifications may be practiced within the scope of the appended claims. Accordingly, the present implementations are to be considered as illustrative and not restrictive, and the invention is not to be limited to the details given herein, but may be modified within the scope and equivalents of the appended claims.

What is claimed is:

1. A computer-executable method of managing replication within a data storage system, the computer-executable method comprising:
   receiving an error related to a replication session within the data storage system;
   analyzing the error;
   based on the analysis, determining whether to retry the replication session;
   upon a positive determination, calculating a first time interval for the replication session;
   retrying the replication session upon completion of the first time interval; and
   wherein the first time interval for the replication session is calculated using a recover point objective and based on whether previous errors have been received in relation to the replication session.

2. The computer-executable method of claim 1, wherein analyzing comprises:
   determining a type of the error, wherein the error is enabled to be temporary or permanent.

3. The computer-executable method of claim 2, wherein the determining comprises making a positive determination if the error is temporary.

4. The computer-executable method of claim 2, wherein the determining comprises making a negative determination if the error is permanent.

5. The computer-executable method of claim 1, further comprising:
   receiving a second error related to the replication session;
   analyzing the second error;
   based on the analysis of the second error, determining whether to retry the replication session;
   upon a positive determination, calculating a second time interval for the replication session;
   retrying the replication session upon completion of the second time interval.

6. The computer-executable method of claim 1, further comprising:
   receiving notification of a major system event; and
   retrying replication sessions currently paused due to the associated time interval.

7. A system, comprising:
   a data storage system; and
   computer-executable program logic encoded in memory of one or more computers enabled to manage replication within the data storage system, wherein the computer-executable program logic is configured for the execution of:
receiving an error related to a replication session within the data storage system;
analyzing the error;
based on the analysis, determining whether to retry the replication session;
upon a positive determination, calculating a first time interval for the replication session;
retrying the replication session upon completion of the first time interval; and
wherein the first time interval for the replication session is calculated using a recover point objective and based on whether previous errors have been received in relation to the replication session.

8. The system of claim 7, wherein analyzing comprises: determining a type of the error, wherein the error is enabled to be temporary or permanent.

9. The system of claim 8, wherein the determining comprises making a positive determination if the error is temporary.

10. The system of claim 8, wherein the determining comprises making a negative determination if the error is permanent.

11. The system of claim 7, wherein the computer-executable program logic is further configured for the execution of:
receiving a second error related to the replication session;
analyzing the second error;
based on the analysis of the second error, determining whether to retry the replication session;
upon a positive determination, calculating a second time interval for the replication session;
retrying the replication session upon completion of the second time interval.

12. The system of claim 7, wherein the computer-executable program logic is further configured for the execution of:
receiving notification of a major system event; and
retrying replication sessions currently paused due to the associated time interval.

13. A computer program product for managing replication within a data storage system, the computer program product comprising:
a non-transitory computer readable medium encoded with computer-executable code, wherein the code is configured to enable the execution of:
receiving an error related to a replication session within the data storage system;
analyzing the error;
based on the analysis, determining whether to retry the replication session;
upon a positive determination, calculating a first time interval for the replication session;
retrying the replication session upon completion of the first time interval; and
wherein the first time interval for the replication session is calculated using a recover point objective and based on whether previous errors have been received in relation to the replication session.

14. The computer program product of claim 13, wherein analyzing comprises:
determining a type of the error, wherein the error is enabled to be temporary or permanent.

15. The computer program product of claim 14, wherein the determining comprises making a positive determination if the error is temporary.

16. The computer program product of claim 14, wherein the determining comprises making a negative determination if the error is permanent.

17. The computer program product of claim 13, wherein the code is further configured to enable the execution of:
receiving a second error related to the replication session;
analyzing the second error;
based on the analysis of the second error, determining whether to retry the replication session;
upon a positive determination, calculating a second time interval for the replication session;
retrying the replication session upon completion of the second time interval.

18. The computer program product of claim 13, wherein the code is further configured to enable the execution of:
receiving notification of a major system event; and
retrying replication sessions currently paused due to the associated time interval.

* * * * *